3,251,806
AMIDE-CONTAINING POLYCARBONATES
John A. Parker, Manheim Township, Lancaster County, and Richard Butterworth, Marcus Hook, Pa., assignors to Armstrong Cork Company, Lancaster, Pa., a corporation of Pennsylvania
No Drawing. Filed Sept. 26, 1962, Ser. No. 226,453
3 Claims. (Cl. 260—47)

This invention relates to polycarbonates, and more particularly to polycarbonates possessing an amide group. Still more particularly, the invention relates to amide-containing polycarbonates which cure on the application of heat.

Polycarbonate films and powders which may be used as coatings, binders, and molded articles, can be made from a variety of bis-phenols and carbonating agents. However, many of the prior polycarbonates are insufficiently high-melting. Others may develop crystallization during the normal wear and tear of use. Crystallization imparts undesirable cloudy appearances to polycarbonate articles in addition to bringing about embrittlement. Hence there is a need for high-melting, thermosetting polycarbonate resin which does not suffer from these shortcomings.

It is a primary object of the present invention to supply such a polycarbonate. It is a further object of the present invention to present an improved polycarbonate having enhanced optical properties. It is still a further object of the present invention to present a polycarbonate possessing an unusually high melting point. Another object is to present improved linear and three-dimensional polycarbonates.

These objects are accomplished in a surprisingly effective and straightforward manner. The invention contemplates forming a polycarbonate by reacting a carbonating agent at a temperature in the range of minus 20° C. to plus 60° C. in the presence of a nonreactive, acid-accepting medium with a bis-(4-hydroxyl phenyl) N,N-dialkyl alkylideneamide.

The bis-phenol which serves as the starting material for the present invention is a bis-(4-hydroxyl phenyl) N,N-dialkyl alkylideneamide. The alkylidene group may contain from 2–8 carbon atoms and will thus constitute the amides of acetic acid through caprylic acid. The amides must be N,N disubstituted with alkyl groups. The N,N-dialkyl alkylideneamides may be readily prepared by heating the ammonium salt of the parent bis-(4-hydroxyl phenyl) alkanoic acids with a secondary amine. The starting di-N-substituted amide may also be prepared in known manner by amide-amide interchange, by amine-ester interchange, and by reaction of a secondary amine with the acid chloride of the parent diphenolic acid compound. The amines and amides used to form the starting amide will be those which will introduce an alkyl group containing 1–4 carbon atoms. Such alkyl groups will be referred to herein as lower alkyl groups. Thus, the amide which is one of the two starting materials in the present invention will have the general formula

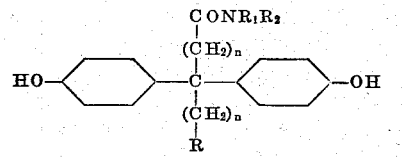

wherein R is selected from the group consisting of hydrogen and alkyl groups containing 1–6 carbon atoms $R_1$ is a lower alkyl group containing 1–4 carbon atoms, $R_2$ is a lower alkyl group containing 1–4 carbon atoms which may be the same or different from $R_1$, $n$ is a number from 0 to 6, and the N,N-dialkyl alkylideneamide group contains 2–8 carbon atoms.

The above-described amide starting material must contain the two N-substituted alkyl groups in order that the final polycarbonate may retain the amide group. If one or two hydrogen atoms are present in the amide group, the amide group will dehydrate to form the nitrile group. Preparation of the nitrile-containing polycarbonate is fully set forth in copending application Serial No. 66,437, now U.S. Patent No. 3,157,617, filed by the same applicants as the applicants herein.

In order to form a polycarbonate of the present invention, the starting amide is taken up in an acid-accepting, nonreactive solvent medium such as pyridine, quinoline, pyridine-methylene chloride mixtures, and solvents such as chloroform, dioxane, and tetrahydrofuran which contain an alkaline material such as sodium hydroxide. Water can be used to form an aqueous emulsion of the solvent and finished polycarbonate if the end product is destined for use wherein the polycarbonate in the form of a gel is not objectionable. The bis-phenol amide is taken up in the reaction medium to an extent of about 2%–60% by weight. Solvents which are inert to the reactants such as low ketones, the low ethers, benzene, or the like may also be used provided they contain an alkaline compound to serve as an acid acceptor.

Once the bis-phenol di-N-substituted amide has been taken up in the solvent, phosgene is introduced into the solvent in order to react with the amide.

The phosgene is preferably simply passed into the reaction medium in order to form the polycarbonate. One mole of phosgene, plus a reasonable excess, is needed for every mole of the bis-phenol amide. The temperature of the reaction should be maintained in the range of about minus 20° C to plus 60° C. Reaction times will be longer at the lower temperatures within this range. The preferred temperature range is 0°–35° C. The reaction is considered complete when the necessary one mole of phosgene or other carbonating agent has been used for each mole of the diphenyl amide.

The amide-containing polycarbonate may be left in the solution in which it is made, or it may be recovered as a powder, or it may be recovered and placed in a different solution entirely. Solutions of the amide-containing polycarbonate may be sprayed, painted, wiped, or otherwise coated on any desired surface. The solvent will evaporate on mere exposure to the air or by the application of heat, and the polycarbonate will be left as a film. Cross linking may be accomplished by heating the film to elevated temperatures of 150° C. and higher, longer times being required at lower temperatures. For example, curing is accomplished in some cases in 4 hours at 150° C., while 15 minutes at 250° C. suffices.

The di-N-substituted amide-containing polycarbonate may be isolated from the reaction mixture as a fine, white powder by the addition of strongly polar solvents such as methyl alcohol. The powder may be taken up in the usual solvents, for example methylene chloride, tetrahydrofuran, and dimethyl formamide, to form solutions if desired. The polycarbonate itself will serve as a binder for in organic filler materials in the manufacture of surface covering.

The formula for the finished polycarbonate is as follows:

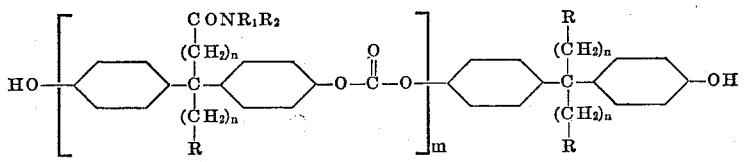

wherein R is selected from the group consisting of hydrogen or an alkyl group containing 1–6 carbon atoms, $R_1$ is a lower alkyl group containing 1–4 carbon atoms, $R_2$ is a lower alkyl group containing 1–4 carbon atoms which may be different from $R_1$, $n$ is a number from 0 to 6, $m$ is a number sufficient to impart a molecular weight to the polycarbonate of 25,000 to 500,000, and the alkylideneamide group contains 2–8 carbon atoms.

The properties of the above-described amide-containing polycarbonate may be modified by copolymerizing the bis-phenol di-N-substituted amide with a bis-phenol of the class

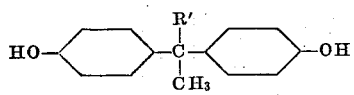

wherein R' is selected from the group consisting of —$CH_3$, and —$CH_2CH_2COOR''$ wherein R'' is an alkyl group containing 1–8 carbon atoms.

The amount of the co-monomer will be in the range of 5–95 mole percent based on the total moles of the bis-phenol amide and the bis-phenol co-monomer. Increased amounts of the bis-phenol and the co-monomer decrease the melting point of the resulting polycarbonate containing the amide groups with the attendant ease of processing of the finished polycarbonate product. Additionally, increasing amounts of the bis-phenol co-monomer may decrease or increase the cross-linking temperature of the final amide-containing polycarbonate.

Where the bis-phenol co-monomer is to be used, it is simply added to the reaction medium along with the bis-phenol amide and the reacton is carried out in the usual manner. The carbonating agent will react with the bis-phenol co-monomer on a mole-for-mole basis, the same as with the bis-phenol amide.

The following examples illustrate several embodiments of the invention. All parts are by weight unless otherwise stated.

*Example 1*

To 800 parts of acetone in a beaker was added 424 parts of 4,4-bis-(4-hydroxyl phenyl) pentanoic acid, and the acid was dissolved by stirring. To the solution there was slowly added with stirring another solution of 243 parts of di-n-butylamine dissolved in 400 parts acetone. An oil soon separated. The oil solidified in standing after which it was filtered, washed once with acetone, and dried under vacuum. The N,N-dibutyl ammonium salt of the acid has a melting point range of 145°–150° C.

The ammonium salt prepared above was melted in a flask fitted with a thermometer and a condenser for collecting water. Heating was accomplished in an oil bath. The temperature was maintained at 185° C. for 20 hours. At the end of that time, the hot mixture was poured into a rapidly stirred mixture of 2 liters of water and 1½ liters of tetrahydrofuran. To the mixture was added 260 parts of methylene chloride. The organic solvent layer was separated and washed consecutively with equal volumes of 5% hydrochloric acid, 5% sodium bicarbonate solution in water, and three times with clear water. During the washing procedure methanol was added to increase settling speed. The organic layer containing the amide was evaporated and redissolved in 1 liter of water and 1 liter of methyl alcohol. As the methanol evaporated on standing, white crystals of N,N-dibutyl 4,4-bis-(4-hydroxyl phenyl) pentanamide were formed. These crystals were used in making the polycarbonate as described below.

Into a three-necked flask equipped with a thermometer, stirrer, gas inlet, and gas outlet, was placed 12.4 parts (0.0312 mole) of the amide prepared as described above, 25 parts of pyridine, and 100 parts of methylene chloride. The flask was cooled. Over a period of 26 minutes, 6 parts (.06 mole) of liquid phosgene in another container was allowed to evaporate and bubble into the reaction mixture. The temperature was maintained at 22° C.

The solution of the polymer was poured into dilute ice water containing hydrochloric acid and washed twice with water. The addition of petroleum ether precipitated the polymer. The polymer was separated, washed, dried, and dissolved in chloroform. Films cast of the polymer from chloroform solution were found to be transparent, flexible, and to have a maximum tensile strength of 5,900 pounds per square inch, and a molecular weight by the light-scattering method of 400,000.

*Example 2*

An ammonium salt was prepared by dissolving 100 parts of dimethyl amine in 400 parts of cooled acetone and then slowly pouring this solution into 1,200 parts of acetone containing 600 parts of 4,4-bis-(4-hydroxy phenyl) pentanoic acid. The white solid was filtered and dried under vacuum.

The dimethyl ammonium salt was melted with difficulty in a flask fitted with thermometer and water-removing condenser; 267 grams of the ammonium salt was used. The flask was heated in an oil bath at 165° C. for 6½ hours, after which the mixture was poured with rapid stirring into equal parts of a mixture of water and tetrahydrofuran. The organic solution of the amide was washed consecutively with 5% hydrochloric acid, sodium bicarbonate solution, and three times with clear water. At various stages during the washing, ethyl acetate and additional tetrahydrofuran were added to assist settling. Benzene was poured into the organic solution and 14.9 parts of white crystals of melting point 222° C. were collected. Additional preparations were made in the same manner.

A total of 17.8 parts of the amide prepared as described above was dissolved in 43 parts of pyridine and 150 parts of methylene chloride in a three-necked flask equipped as described in Example 1. Over a period of 60 minutes, 9.2 parts of phosgene was slowly added. The organic solution of the polycarbonate was poured into dilute hydrochloric acid containing ice and washed twice with water and precipitated as a white solid by the addition of an excess of petroleum ether. The resin had a molecular weight by the light scattering method of 86,500, and formed clear, tough, transparent films when cast from chloroform solutions.

*Example 3*

In the same manner as described in Examples 1 and 2, an amide was prepared by reacting methyl n-butyl amine in an amount of 200 parts (2.30 moles) with 580 parts of 4,4-bis-(4-hydroxyl phenyl) pentanoic acid.

The dried amide was placed in a resin flask equipped with the usual distilling condenser, stirrer, and thermometer. The flask mantle was maintained at 225° C. for a period of 14 hours, at the end of which time the product was worked up by the addition of the resin solution to a mixture of hydrochloric acid and ice water as described earlier. The resulting amide was washed with ether.

A mixture of 70 parts pyridine and 100 parts methylene chloride was prepared, and 15 parts of the above-described amide was dissolved in the mixture over a period of 90 minutes. Phosgene was bubbled into the solution in an amount of 14 parts (0.14 mole). The mixture was then washed with dilute hydrochloric acid solution. On evaporation of the remaining methylene chloride solution of polymer, a clear, tough, transparent film of the amide polycarbonate was formed.

We claim:

1. A polycarbonate containing at least 5 mole percent of the following radical

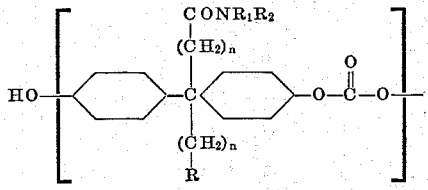

wherein R, $R_1$, and $R_2$ are lower alkyl groups, $n$ is a number from 0 to 6, and the remainder of the molecule consists of alternating carbonate groups and bis-phenol groups.

2. A polycarbonate having the formula

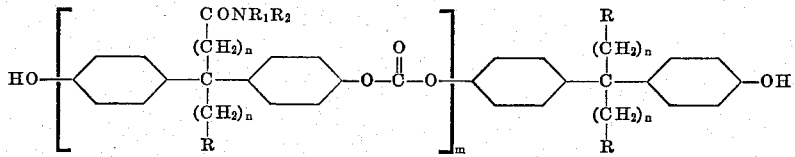

wherein R, $R_1$, and $R_2$ are lower alkyl groups, $n$ is a number from 0 to 6, the alkylideneamide group containing 2–8 carbon atoms, and $m$ is a number sufficient to impart a molecular weight to the polycarbonate of 25,000 to 500,000.

3. A polycarbonate having the formula

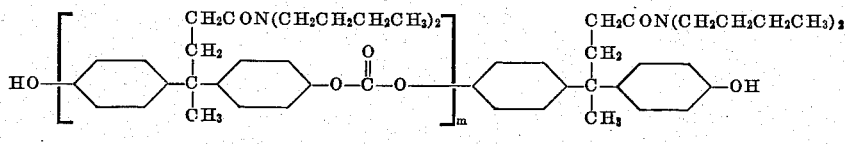

wherein $m$ is a number sufficient to impart a molecular weight to the polycarbonate of 25,000 to 500,000.

References Cited by the Examiner

UNITED STATES PATENTS 2,933,520   4/1960   Bader _____ 260—559 X
3,132,118   5/1964   Butterworth _____ 260—47 X
3,157,617   11/1964  Butterworth _____ 260—47 X

FOREIGN PATENTS 215,238   11/1956   Australia.

WILLIAM H. SHORT, *Primary Examiner.*